(12) United States Patent
Lavine et al.

(10) Patent No.: US 12,050,315 B2
(45) Date of Patent: Jul. 30, 2024

(54) CATOPTRIC FOCUS MECHANISMS FOR HIGH-ENERGY LASER (HEL) SYSTEMS

(71) Applicant: Raytheon Company, Waltham, MA (US)

(72) Inventors: Jason R. Lavine, Mckinney, TX (US); Elizabeth S. Goodwin, Mckinney, TX (US); Steven A. Miller, Mckinney, TX (US)

(73) Assignee: Raytheon Company, Tewksbury, MA (US)

( * ) Notice: Subject to any disclaimer, the term of this patent is extended or adjusted under 35 U.S.C. 154(b) by 834 days.

(21) Appl. No.: 16/943,948

(22) Filed: Jul. 30, 2020

(65) Prior Publication Data

US 2022/0035149 A1 Feb. 3, 2022

(51) Int. Cl.
| | |
|---|---|
| *G02B 26/08* | (2006.01) |
| *F41H 13/00* | (2006.01) |
| *G01S 7/481* | (2006.01) |
| *G01S 17/66* | (2006.01) |
| *G02B 17/06* | (2006.01) |
| *H01S 3/00* | (2006.01) |

(52) U.S. Cl.
CPC ..... *G02B 26/0833* (2013.01); *F41H 13/0062* (2013.01); *G01S 7/4812* (2013.01); *G01S 17/66* (2013.01); *G02B 17/06* (2013.01); *H01S 3/0071* (2013.01)

(58) Field of Classification Search
CPC .............. G02B 26/0833; G02B 17/06; G02B 19/0057; G02B 19/0023; G02B 26/0825; G02B 5/10; F41H 13/0062; F41H 13/005; G01S 7/4812; G01S 17/66; H01S 3/0071
See application file for complete search history.

(56) References Cited

U.S. PATENT DOCUMENTS

| | | | |
|---|---|---|---|
| 4,989,951 A | 2/1991 | Miyano et al. | |
| 6,053,409 A | 4/2000 | Brobst et al. | |
| 6,603,793 B2 | 8/2003 | Vetrovec | |

(Continued)

FOREIGN PATENT DOCUMENTS

| | | |
|---|---|---|
| CN | 102608757 B | 10/2014 |
| FR | 2786938 B1 | 10/2001 |
| JP | 2008026643 A | 2/2008 |

OTHER PUBLICATIONS

Braunreiter et al., "Atmospheric Jitter Correction and Target Tracking Using Single Imaging Sensor in High-Energy Laser Systems", U.S. Appl. No. 16/674,995, filed Nov. 5, 2019, 52 pages.

(Continued)

*Primary Examiner* — Euncha P Cherry

(57) ABSTRACT

An apparatus includes a deformable mirror. The deformable mirror includes a reflective surface configured to reflect a high-energy laser (HEL) beam and to focus the HEL beam on a target. The deformable mirror also includes multiple actuators configured to adjust a shape of the reflective surface in order to maintain focus of the HEL beam on the target over a specified range of distances between the deformable mirror and the target. At least one portion of the reflective surface is configured to be adjusted by the actuators and obtain convex, flat, and concave shapes.

20 Claims, 5 Drawing Sheets

(56) References Cited

U.S. PATENT DOCUMENTS

| | | | |
|---|---|---|---|
| 2002/0153362 A1* | 10/2002 | Sandstrom | G03F 7/70291 219/121.73 |
| 2010/0012863 A1* | 1/2010 | Zacharias | G21K 1/06 250/505.1 |
| 2010/0202071 A1* | 8/2010 | Preumont | G02B 26/06 359/849 |
| 2012/0298839 A1 | 11/2012 | King et al. | |
| 2016/0062076 A1* | 3/2016 | Ko | G02B 7/09 310/300 |
| 2018/0267299 A1* | 9/2018 | Sitter, Jr. | G01S 17/66 |

OTHER PUBLICATIONS

Braunreiter, "Super-Resolution Automatic Target Aimpoint Recognition and Tracking", U.S. Appl. No. 16/702,279, filed Dec. 3, 2019, 50 pages.

"Invitation to Pay Additional Fees and, Where Applicable, Protest Fee" issued by the International Searching Authority in connection with International Patent Application No. PCT/US2021/038129 dated Mar. 30, 2022, 8 pages.

Mrna et al., "Deformable mirror for high power laser applications", Proceedings of SPIE-The International Society for Optical Engineering, vol. 9442, Jan. 2015, 6 pages.

\* cited by examiner

CATOPTRIC FOCUS MECHANISMS FOR HIGH-ENERGY LASER (HEL) SYSTEMS

TECHNICAL FIELD

This disclosure generally relates to laser systems. More specifically, this disclosure relates to catoptric focus mechanisms for high-energy laser (HEL) systems.

BACKGROUND

Various types of laser systems are being developed for a number of commercial and defense-related applications. For example, high-energy laser (HEL) systems may be used to direct high-energy laser beams at incoming missiles, rockets, or mortars, drones or other unmanned aerial vehicles, or other targets. An HEL system typically requires a focus mechanism in order to maximize the far field irradiance on a specified target, meaning the focus mechanism helps to maximize the amount of laser energy that reaches the specified target. Focus is traditionally achieved in a laser system using refractive optics or one or more moving mirrors in a telescope.

SUMMARY

This disclosure provides catoptric focus mechanisms for high-energy laser (HEL) systems.

In a first embodiment, an apparatus includes a deformable mirror. The deformable mirror includes a reflective surface configured to reflect an HEL beam and to focus the HEL beam on a target. The deformable mirror also includes multiple actuators configured to adjust a shape of the reflective surface in order to maintain focus of the HEL beam on the target over a specified range of distances between the deformable mirror and the target. At least one portion of the reflective surface is configured to be adjusted by the actuators and obtain convex, flat, and concave shapes.

In a second embodiment, a system includes at least one light source configured to generate at least an HEL beam. The system also includes a telescope configured to direct the HEL beam towards a target and to receive optical energy from the target. The system further includes at least one camera configured to image the target based on the received optical energy. In addition, the system includes a catoptric focus mechanism that includes a deformable mirror. The deformable mirror includes a reflective surface configured to reflect the HEL beam and to focus the HEL beam on the target. The deformable mirror also includes multiple actuators configured to adjust a shape of the reflective surface in order to maintain focus of the HEL beam on the target over a specified range of distances between the deformable mirror and the target. At least one portion of the reflective surface is configured to be adjusted by the actuators and obtain convex, flat, and concave shapes.

In a third embodiment, a method includes generating an HEL beam and directing the HEL beam towards a target. The method also includes receiving optical energy from the target and imaging the target based on the received optical energy. The method further includes, using a catoptric focus mechanism that includes a deformable mirror, focusing the HEL beam on the target. The deformable mirror includes a reflective surface configured to reflect the HEL beam and to focus the HEL beam on the target. The deformable mirror also includes multiple actuators configured to adjust a shape of the reflective surface in order to maintain focus of the HEL beam on the target over a specified range of distances between the deformable mirror and the target. At least one portion of the reflective surface is configured to be adjusted by the actuators and obtain convex, flat, and concave shapes.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 6, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, a high-energy laser (HEL) system typically requires a focus mechanism in order to maximize the far field irradiance on a specified target. Focus is traditionally achieved in a laser system using refractive optics or one or more moving mirrors in a telescope. However, these approaches can suffer from various shortcomings. For example, the use of refractive optics can create large optical losses in the optical path of an HEL beam. As another example, moving a secondary mirror of a telescope for focus control is bulky and tends to introduce significant aberrations in the HEL beam. Overall, these approaches can negatively impact energy maintenance (particularly at high power levels) or beam qualities and can suffer from material limitations.

This disclosure provides catoptric focus mechanisms for HEL systems. As described in more detail below, a catoptric focus mechanism includes a deformable mirror, which is used to help focus an HEL beam on a specified target. The deformable mirror includes a reflective surface and actuators that can change the shape of the reflective surface in order to achieve the desired focus of the HEL beam on the target. The actuators can be used to achieve focus over a range of engagement distances between the laser system and the specified target, such as between about 300 meters to about 5,000 meters.

Because deformable mirrors are reflective rather than refractive, the catoptric focus mechanisms suffer from smaller optical losses. As a result, the deformable mirrors can help to increase or maximize the output powers of the laser systems. Also, deformable mirrors can be used in compact packages, which can be desirable in various systems and particularly in those systems having more restrictive size, weight, and power (SWaP) constraints. In addition, deformable mirrors can be used to help reduce or minimize aberrations in HEL beams. Overall, catoptric focus mechanisms can help to significantly improve the output powers and effectiveness of various HEL systems.

Figure 1:
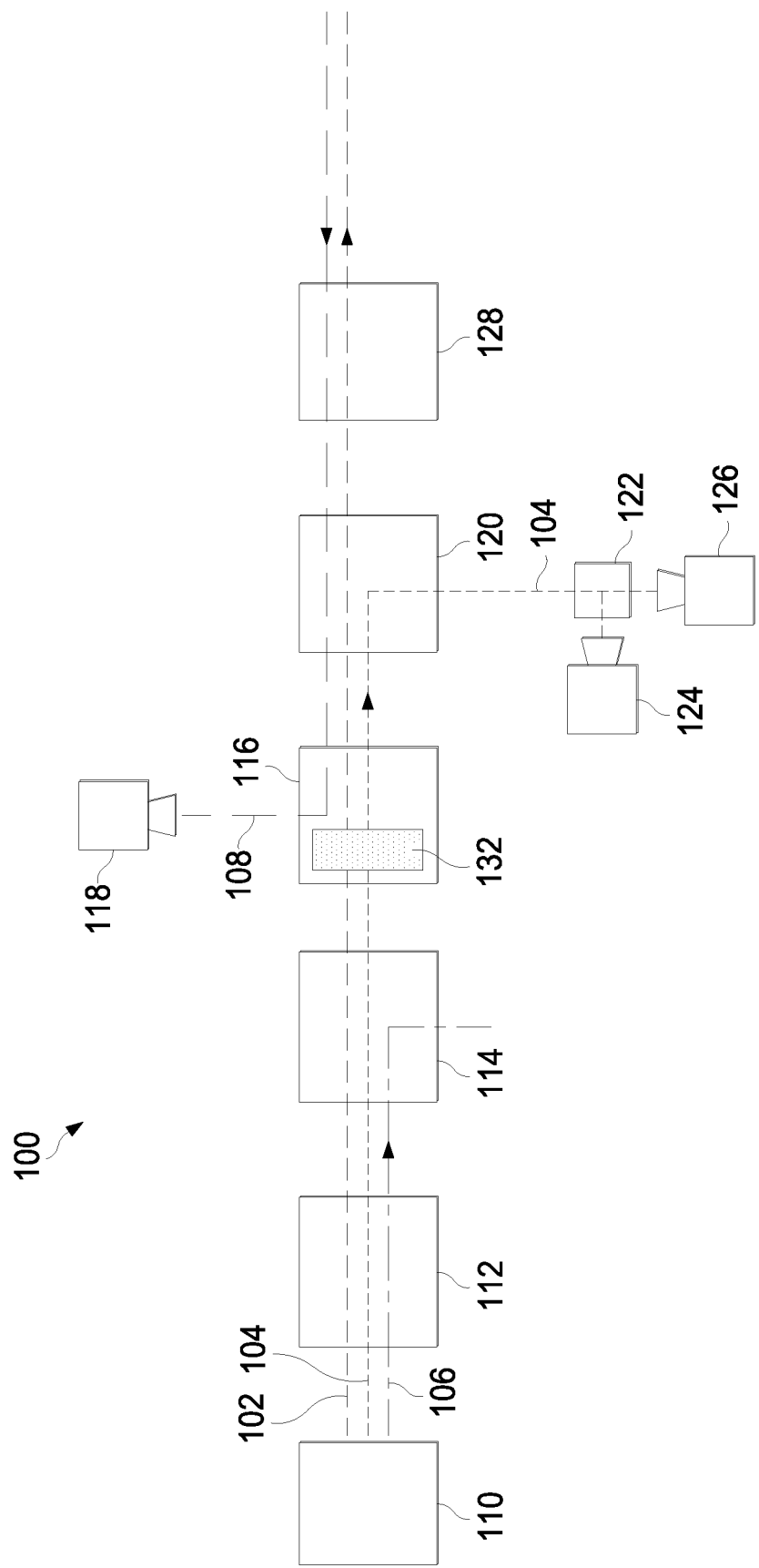
FIG. 1 illustrates an example laser system having a catoptric focus mechanism in accordance with this disclosure.

FIG. 1 illustrates an example laser system 100 having a catoptric focus mechanism in accordance with this disclosure. Note that the specific example of the laser system 100 shown here is for illustration only. Among other uses, the laser system 100 here may be used in an HEL application, such as a directed energy weapon.

Other applications are also possible, and non-limiting examples of these applications are described below. This example of the laser system 100 generally includes a common optical path that is configured to handle multiple laser beams of different types, such as an HEL beam and one or more additional beams, over at least part of the optical path. The one or more additional beams may include, for instance, an auto-alignment beam and a target-tracking beam. Note, however, that the use of multiple types of beams is not required.

As shown in FIG. 1, the system 100 includes various components that support the use of one or more laser beams 102, 104, and 106. In this example, the beam 102 represents an HEL beam, the beam 104 represents an auto-alignment (AA) beam, and the beam 106 represents a target or boresight illuminator beam. The system 100 also receives incoming optical energy 108, which may be received from a target being illuminated or otherwise viewed by the system 100.

The beams 102, 104, and 106 may typically have different wavelengths and power levels. For example, the HEL beam 102 may have a highest power level in order to damage or destroy a target or perform some other desired function. The target or boresight illuminator beam 106 may have an intermediate power level and high divergence in order to illuminate a target so that the illuminated target produces at least some of the incoming optical energy 108. The target or boresight illuminator beam 106 may have only one or several wavelengths so that target tracking may involve examining only the one or several wavelengths of the beam 106. The auto-alignment beam 104 may have a lowest power level since it may only be used internally within the system 100. As particular examples, the HEL beam 102 may have ten kilowatts of power or more, and the target or boresight illuminator beam 106 may have fifty watts of power.

In the illustrated example, the beams 102, 104, and 106 are produced using one or more lasers or other light sources 110. In some embodiments, the beams 102, 104, and 106 are produced using different light sources 110, although this need not be the case. Each light source 110 includes any suitable structure configured to generate one or more beams of optical energy. For example, the light source 110 may include one or more laser diodes or laser diode arrays configured to generate each laser beam that is output from the light source 110. Note that while the light source 110 here is shown as generating three beams 102, 104, and 106, at least one light source 110 may be used to generate a single beam, two beams, or more than three beams depending on the needs of a given system.

Some or all of the beams 102, 104, and 106 may be initially misaligned, such as due to angular and/or spatial misalignment. The beams 102, 104, and 106 may pass through a beam correction block 112, which can be used to correct the misalignment of some or all of the beams 102, 104, and 106. For example, the beam correction block 112 may include one or more fast steering mirrors (FSMs) or other optical devices that can be controlled in order to redirect at least one of the beams 102, 104, and 106 and thereby correct at least some of the misalignment of the beams 102, 104, and 106. Note, however, that any other suitable devices or mechanisms for correcting beam misalignment may be used here.

The aligned beams 102, 104, and 106 pass into a beam director block 114, which separates the target or boresight illuminator beam 106 from the other beams 102, 104. The target or boresight illuminator beam 106 may then be transmitted towards a target in order to illuminate the target. For example, the target or boresight illuminator beam 106 may be used to illuminate a target during firing of the HEL beam 102 in order to help maintain target acquisition during the laser heating process. The target or boresight illuminator beam 106 can therefore exit the laser system 100 without passing through all of the other optics or components as the HEL beam 102. The beam director block 114 includes any suitable structure configured to direct different optical energies in different ways. Note, however, that the use of the target or boresight illuminator beam 106 and the beam director block 114 is optional, and the target or boresight illuminator beam 106 and the beam director block 114 may be omitted.

The aligned beams 102 and 104 also pass into a beam director block 116, which also receives the incoming optical energy 108. The beam director block 116 redirects the incoming optical energy 108 to a high-speed tracking sensor 118. The incoming optical energy 108 includes optical energy that is reflected from, generated by, or otherwise provided from a target, which may (but need not) include reflected energy from the target or boresight illuminator beam 106. Outputs from the tracking sensor 118 may be used for various purposes, such as to provide imaging feedback or to position the HEL beam 102 on the target. The tracking sensor 118 includes any suitable sensor for processing illumination from a target, such as any of a variety of cameras or other sensors for target acquisition and tracking. In some embodiments, the tracking sensor 118 may represent a 30 Hz or other camera configured to detect short-wavelength infrared (SWIR) and/or near infrared (NIR) radiation. The beam director block 116 also passes the aligned beams 102 and 104. The beam director block 116 includes any suitable structure configured to direct different optical energies in different ways.

The aligned beams 102 and 104 further pass into a beam director block 120, which separates the auto-alignment beam 104 from the HEL beam 102. The auto-alignment beam 104 may then be transmitted towards a beam splitter 122, which provides portions of the auto-alignment beam 104 to beam correction or coudé optical position sensors (COPS) 124 and 126. The sensors 124 and 126 provide measurements of angular and spatial beam error and are thereby configured to image the optical components of the laser system 100. Adjustments may then be made to one or more fast steering mirrors or other optical components of the laser system 100 to change the position or direction of the auto-alignment beam 104 (and thereby change the position or direction of the aligned HEL beam 102). Note, however, that the use of the auto-alignment beam 104 is optional, and portions of the HEL beam 102 itself may be sent to the sensors 124 and 126 for use in determining the appropriate correction.

The HEL beam 102 also passes into a high-speed tracking correction block 128, which uses one or more components to correct for beam deficiencies in the HEL beam 102. For example, the tracking correction block 128 may include one or more fast steering mirrors that are used to correct for errors introduced by misaligned optical elements in the laser system 100. In some embodiments, the tracking correction block 128 may be adjusted based on data from the sensors 124 and 126 in order to control the operation of the fast steering mirror(s) or other devices in the tracking correction block 128.

Note that one, some, or all of the various components 112, 114, 116, 120, and 128 can be subject to monitoring by various sensors, such as the sensor(s) 118, 124, and/or 126. This allows an external controller or control system to make suitable corrections to fast steering mirrors or other optical components within the laser system 100 in order to achieve desired operation. Among other things, this may help the controller or control system to maintain the HEL beam 102 on a desired location of a target.

The beam director block 116 in this example includes a catoptric focus mechanism 132. As described in more detail below, the catoptric focus mechanism 132 includes a deformable mirror, which includes a deformable reflective surface that can be used to alter a focus of the HEL beam 102 on a target. The deformable mirror also includes multiple actuators that can be used to change the shape of the deformable reflective surface. The shape of the deformable reflective surface can be altered in order to adjust the focus of the HEL beam 102 over a desired range of distances, such as about 300 meters to about 5,000 meters. Note, however, that other ranges of focus for the HEL beam 102 may be achieved depending on various factors, such as the design of the deformable mirror. Example embodiments of the catoptric focus mechanism 132 and its deformable mirror are provided below.

Although FIG. 1 illustrates one example of a laser system 100 having a catoptric focus mechanism, various changes may be made to FIG. 1. For example, the system 100 may be used in any suitable environment for any suitable purpose. In general, the system 100 can be used in any number of ways depending on the application. Also, the makeup and arrangement of the system 100 shown in FIG. 1 are for illustration only, and components can be added, omitted, combined, further subdivided, replicated, or placed in any other suitable configuration according to particular needs. As a particular example, any specific arrangement of mirrors, beam directors, beam splitters, and other devices in FIG. 1 used to route different optical beams may be based on specific implementation needs, and other arrangements of the optical devices may be used to direct optical beams in the desired manner. In addition, the number(s) and type(s) of devices can vary based on the specific needs in a system. In general, this disclosure is not limited to any specific arrangement of optical devices or other devices in a system.

As noted above, there are various commercial and other non-defense-related applications for high-energy laser systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
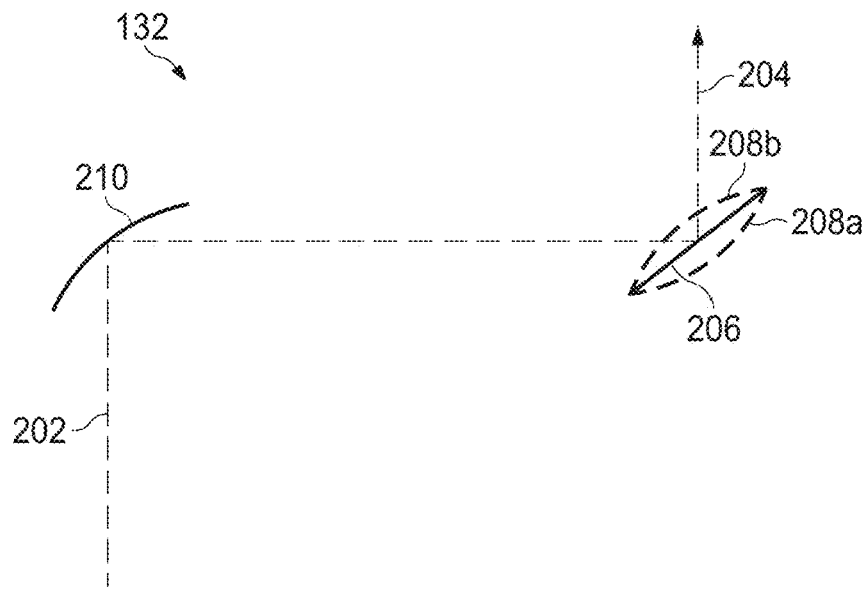
FIG. 2 illustrates an example catoptric focus mechanism for use in a laser system in accordance with this disclosure.

FIG. 2 illustrates an example catoptric focus mechanism 132 for use in a laser system in accordance with this disclosure. For ease of explanation, the catoptric focus mechanism 132 shown in FIG. 2 may be described as being used in the system 100 of FIG. 1. However, the catoptric focus mechanism 132 may be used in any other suitable system.

As shown in FIG. 2, the catoptric focus mechanism 132 operates to receive an incoming beam 202 of laser energy and to produce a focused output beam 204 of laser energy. The focused output beam 204 of laser energy ideally has substantially equal energy or power compared to the incoming beam 202 of laser energy, meaning the catoptric focus mechanism 132 imparts very little optical loss. Among other things, this can help to increase or maximize the laser energy that is directed on a target. The incoming beam 202 of laser energy may represent a collimated beam of energy. In some embodiments, the incoming beam 202 of laser energy represents the HEL beam 102 (with or without the auto-alignment beam 104).

In the example shown in FIG. 2, the catoptric focus mechanism 132 includes a deformable mirror 206, which can be deformed as needed in order to provide focus control for directing the incoming beam 202 at a target as the focused output beam 204. The deformable mirror 206 here can be deformed to provide HEL focus over the entire range of expected engagement distances between the catoptric focus mechanism 132 and the target. As described above, for example, the target may be between about 300 meters to about 5,000 meters from a laser system that includes the catoptric focus mechanism 132.

Two dashed lines 208a-208b are shown here to illustrate that the deformable mirror 206 can be flat or deformed to become more concave or more convex (from the perspective of the incoming beam 202) depending on the particular focusing needs at any given time. This defines a range of deformation in which the deformable mirror 206 can range from a maximally convex shape to a maximally concave shape. This range of deformation can be achieved by using actuators having the ability to both push and pull on the deformable mirror 206. The deformable mirror 206 can therefore be deformed in both directions in order to facilitate focusing of optical energy onto a specified target over a range (and possibly a wide range) of distances. The maximal convex and concave shapes are based on the total range of movement of the various actuators in the deformable mirror 206.

In this particular example, a mirror 210 (often referred to as a "helper" mirror) is used to help focus the incoming beam 202 independent of the deformable mirror 206. This can provide a nominal amount of focusing for the incoming beam 202 in addition to the focusing provided by the deformable mirror 206. Note that while the helper mirror 210 is shown here as being used prior to the deformable mirror 206, the helper mirror 210 may be optically positioned after the deformable mirror 206. Also note that while a single helper mirror 210 is shown here, it may be possible to include multiple helper mirrors 210 in the catoptric focus mechanism 132, and the multiple helper mirrors 210 may be optically positioned before and/or after the deformable mirror 206.

As can be seen in FIG. 2, the catoptric focus mechanism 132 uses one or more reflective optical devices (as opposed to refractive optical devices) to provide focusing of the incoming beam 202. Reflective optical devices typically have significantly lower optical losses compared to refractive optical devices. As a particular example, a system that uses reflective optical devices to provide focus control may have optical losses that are less than 10% of the optical losses in a similar system that uses refractive optical devices to provide focus control. Also, while the use of refractive optical devices might be simpler to implement, refractive optical devices can require significantly more thermal management compared to reflective optical devices. This is because reflective optical devices will typically absorb significantly less optical energy compared to refractive optical devices. Further, reflective optical devices may be used to provide significantly faster focusing response compared to refractive optical devices. For instance, in some cases, it might take about two seconds to establish or reestablish focus on a target using refractive optical devices, while it might take less than about 20 milliseconds to establish or reestablish focus on a target using reflective optical devices. In addition, the use of reflective optical devices including a deformable mirror allow the catoptric focus mechanism 132 to be used to provide afocal corrections and heating corrections (such as to correct for astigmatism and coma) in addition to providing focus control. Among other things, this can help to reduce wavefront errors or other optical errors in the focused output beam 204, possibly quite significantly (such as a reduction of about 20% or more).

Although FIG. 2 illustrates one example of a catoptric focus mechanism 132 for use in a laser system, various changes may be made to FIG. 2. For example, while focusing of a single beam is shown here, the catoptric focus mechanism 132 may be used to focus multiple beams simultaneously (such as the HEL beam 102 and the autoalignment beam 104).

Figure 3:
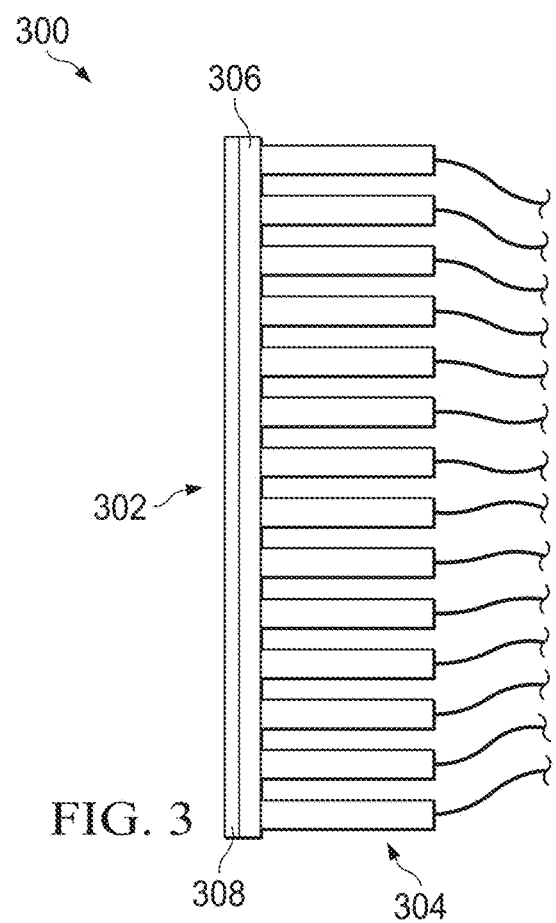
FIG. 3 illustrates an example deformable mirror for use in a catoptric focus mechanism in accordance with this disclosure.

FIG. 3 illustrates an example deformable mirror 300 for use in a catoptric focus mechanism in accordance with this disclosure. The deformable mirror 300 may, for instance, represent an example implementation of the deformable mirror 206 in FIG. 2. Note, however, that the deformable mirror 206 may be implemented in any other suitable manner. Also note that the deformable mirror 300 may be used in any other suitable catoptric focus mechanism or system.

As shown in FIG. 3, the deformable mirror 300 includes a deformable reflective surface 302 and multiple actuators 304. The reflective surface 302 represents a surface from which one or more laser beams are reflected and which can be deformed as needed to provide focus control for the laser beam(s). The reflective surface 302 may have any suitable size, shape, and dimensions. In some embodiments, the reflective surface 302 may be very thin, such as about 0.5 millimeters. Note that the size, shape, and dimensions of the reflective surface 302 may often depend on the specific application in which the deformable mirror 300 is used.

The reflective surface 302 may also be formed from any suitable materials and in any suitable manner. In some embodiments, for instance, the reflective surface 302 may represent a face sheet element mirror that includes a face sheet 306 and a reflective film 308 on the face sheet 306. The face sheet 306 may be formed from any suitable material(s) configured to carry a reflective film, such as silicon or a silicon-based compound like silicon carbide. The reflective film 308 may also be formed from any suitable material(s), such as a thin film stack. In particular embodiments, the reflective surface 302 may have a very high reflectivity, such as a reflectivity of 99.99% or higher.

The actuators 304 are used to deform the reflective surface 302 as needed in order to provide focus control and possibly afocal and heating corrections, such as astigmatism and coma corrections. For example, each actuator 304 may be configured to push and pull on a specific location of the reflective surface 302 in order to deform the reflective surface 302 at and around that specific location. This allows the reflective surface 302 overall to become more concave or more convex depending on the particular focusing needs at any given time. This also allows the reflective surface 302 to be deformed in individual locations to provide desired focal or afocal corrections. Each actuator 304 includes any suitable structure configured to push or pull on a reflective surface in order to locally deform the reflective surface. In some embodiments, each actuator 304 may have a "throw" (defined as the maximum amount of travel of the actuator 304 between extreme positions) of about 18 µm and a size of about 5 µm square.

The number of actuators 304 and the arrangement of those actuators 304 can control how the reflective surface 302 and individual areas of the reflective surface 302 are able to be deformed. In general, larger numbers of actuators 304 are typically preferred since this enables finer control of how individual areas of the reflective surface 302 are deformed. Among other things, this may allow for finer focus control and/or finer afocal and heating corrections. However, fewer actuators 304 may be used as needed, such as with smaller reflective surfaces 302 or when there are size, weight, or power constraints. In addition, the arrangement of the actuators 304 may vary based on the desired amount of control over the shape of the reflective surface 302 and the expected locations where that control is needed. As a result, the number of actuators 304 and the arrangement of those actuators 304 can vary depending on a number of factors associated with any given implementation.

In some embodiments, the actuators 304 may be arranged in multiple rings, such as when a first ring includes one or more actuators 304 at or near a middle of the reflective surface 302, a second ring includes multiple actuators 304 around the first ring, and a third ring includes multiple actuators 304 around the second ring. Again, the number of actuators 304 in each ring and the spacing between the actuators 304 can vary as needed or desired. In particular embodiments, the actuators 304 can be arranged in a specified pattern, such as a hexagonal pattern. In a hexagonal pattern, each actuator 304 (except for the outer actuators 304) can have six neighboring actuators 304 in a hexagonal arrangement. Note, however, that other arrangements of the actuators 304 may be used. In addition, adjacent actuators 304 may have any desired spacing depending on (among other things) the number of actuators and the desired control over the deformation of the reflective surface 302. In some cases, each pair of adjacent actuators 304 may have a nominal spacing of about 10 millimeters between those actuators 304.

Although FIG. 3 illustrates one example of a deformable mirror 300 for use in a catoptric focus mechanism, various changes may be made to FIG. 3. For example, a deformable mirror 300 may include any other suitable reflective surface 302 and any other suitable number and arrangement of actuators 304.

Figure 4A:
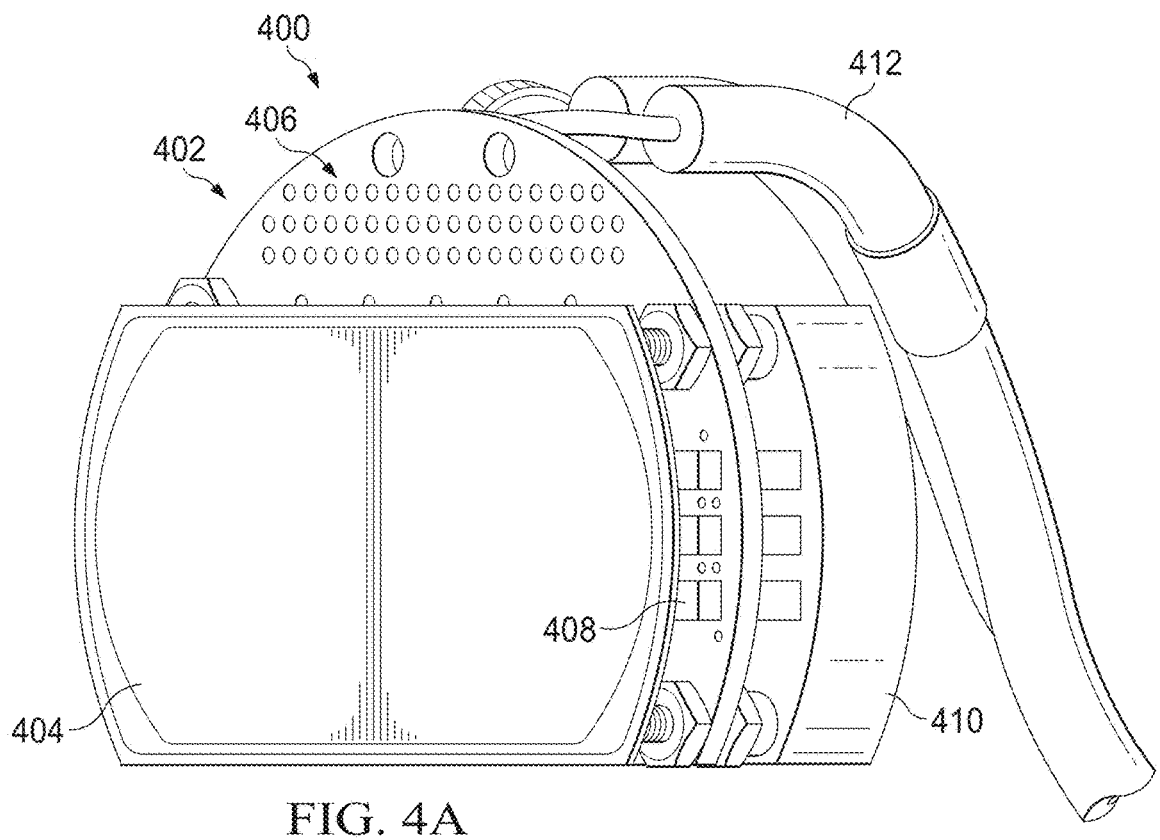
FIGS. 4A and 4B illustrate a specific example implementation of a deformable mirror for use in a catoptric focus mechanism in accordance with this disclosure.
Figure 4B:
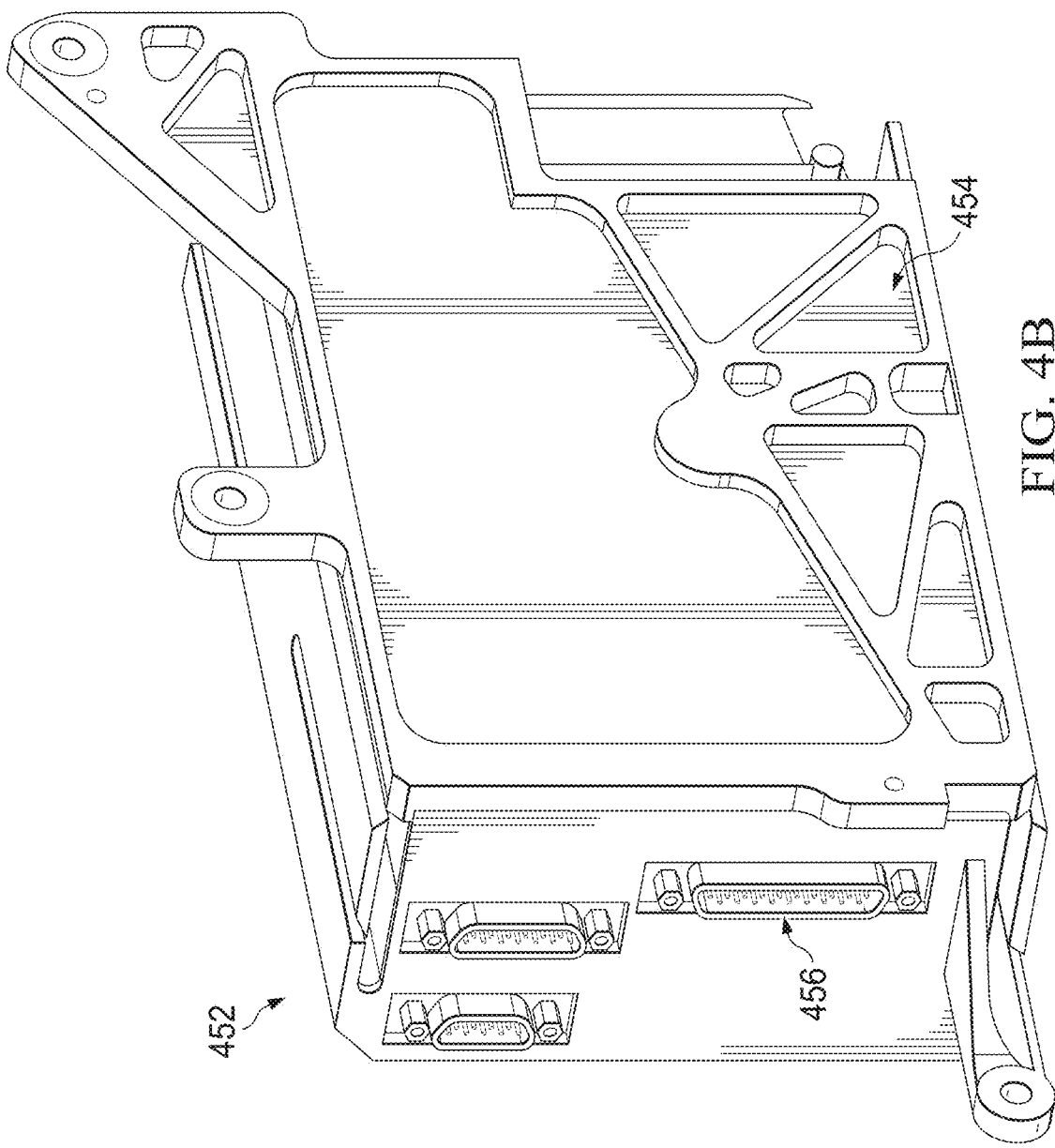

FIGS. 4A and 4B illustrate a specific example implementation of a deformable mirror 400 for use in a catoptric focus mechanism in accordance with this disclosure. The deformable mirror 400 may, for instance, represent an example implementation of the deformable mirror 206 in FIG. 2 or the deformable mirror 300 in FIG. 3. Note, however, that the deformable mirror 206 or 300 may be implemented in any other suitable manner. Also note that the deformable mirror 400 may be used in any other suitable catoptric focus mechanism or system.

As shown in FIGS. 4A and 4B, the deformable mirror 400 includes a mirror section 402 and a controller or control section 452. The mirror section 402 generally includes a deformable reflective surface 404, which may be the same as or similar to the reflective surface 302 described above. The deformable reflective surface 404 here may have any desired size, shape, and dimensions.

The reflective surface 404 is coupled to an actuator board 406, which represents a circuit board or other substate on which various actuators 408 are mounted. The actuators 408 may be the same as or similar to the actuators 304 discussed above. Here, the reflective surface 404 can be fixedly coupled to the actuator board 406, such as along its outer periphery. Also, the actuators 408 can be positioned between the reflective surface 404 and the actuator board 406 so that the actuators 408 can push and pull on various portions of the reflective surface 404. The actuator board 406 may include a substrate and electrical pathways in or on the substrate, where the electrical pathways provide power and control signals to the actuators 408. Any suitable number of actuators 408 may be used here, and the actuators 408 may have any suitable arrangement. The actuator board 406 can be coupled to a base 410, which may represent a portion of the mirror section 402 that can be mounted to a support structure or other structure in order to position the reflective surface 404 in a desired location. An electrical cable 412 can be used to transport power and control signals to the mirror section 402.

The control section 452 generally includes the components used to control the actuators 408 in order to control the deformation of the reflective surface 404. As shown here, the control section 452 includes a housing 454, which protects various other components (such as electronics) of the control section 452. The housing 454 can have any suitable size, shape, and dimensions and can be formed from any suitable materials (such as metal or ruggedized plastic). In this example, the housing 454 includes various flanges that allow the housing 454 to be coupled to a support structure or other structure in order to position the control section 452 in a desired location, although the exact structure of the housing 454 can vary widely. The control section 452 also includes one or more communication ports 456 that allow the control section 452 to interact with one or more external devices or systems (including the mirror section 402). Any suitable type(s) of communication port(s) 456 may be used with the control section 452. The electronics within the control section 452 can be used to control which actuators 408 are activated and how (such as whether each actuator 408 is pushing or pulling and by how much) in order to control the deformation of the reflective surface 404.

Although FIGS. 4A and 4B illustrate one specific example of an implementation of a deformable mirror 400 for use in a catoptric focus mechanism, various changes may be made to FIGS. 4A and 4B. For example, the sizes, shapes, and dimensions of the various components in FIGS. 4A and 4B can vary as needed or desired.

Figure 5:
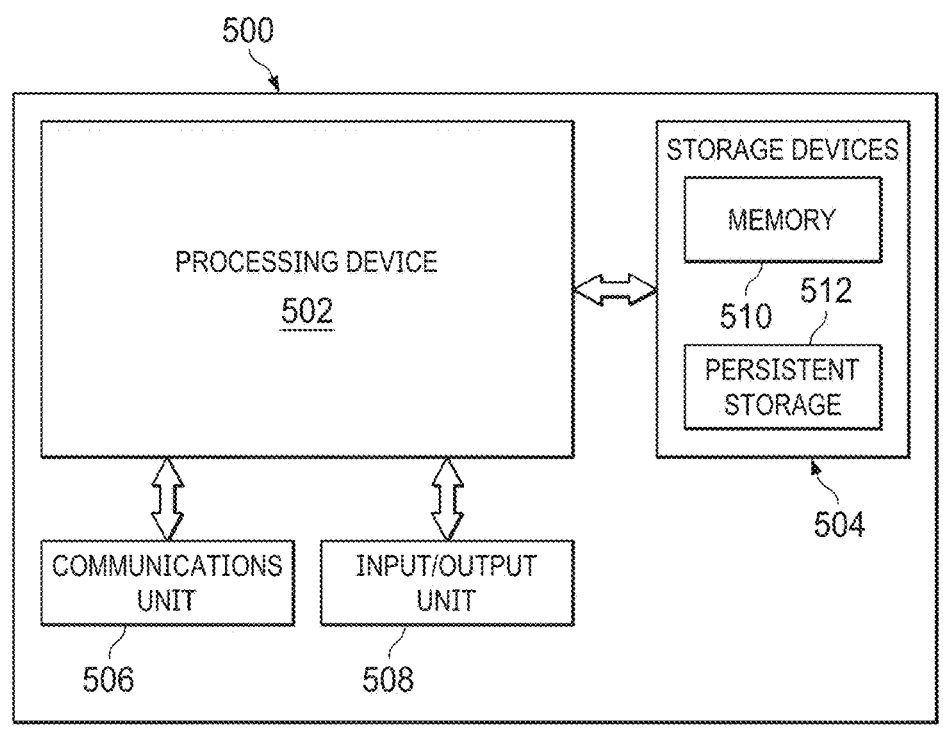
FIG. 5 illustrates an example control system for use with a catoptric focus mechanism in accordance with this disclosure.

FIG. 5 illustrates an example control system 500 for use in a catoptric focus mechanism in accordance with this disclosure. The control system 500 may, for example, be used to control how one or more actuators 304, 408 are used to deform a reflective surface 302, 404 of a deformable mirror 300, 400. As a particular example, the control system 500 may represent at least some of the electronics included in the control section 452 of FIG. 4B. Note, however, that a deformable mirror may be controlled in any other suitable manner.

As shown in FIG. 5, the control system 500 includes at least one processing device 502, at least one storage device 504, at least one communications unit 506, and at least one input/output (I/O) unit 508. The processing device 502 may execute instructions that can be loaded into a memory 510. The processing device 502 includes any suitable number(s) and type(s) of processors or other devices in any suitable arrangement. Example types of processing devices 502 include one or more microprocessors, microcontrollers, digital signal processors (DSPs), application specific integrated circuits (ASICs), field programmable gate arrays (FPGAs), or discrete circuitry.

The memory 510 and a persistent storage 512 are examples of storage devices 504, which represent any structure(s) capable of storing and facilitating retrieval of information (such as data, program code, and/or other suitable information on a temporary or permanent basis). The memory 510 may represent a random access memory or any other suitable volatile or non-volatile storage device(s). The persistent storage 512 may contain one or more components or devices supporting longer-term storage of data, such as a read only memory, hard drive, Flash memory, or optical disc.

The communications unit 506 supports communications with other systems or devices. For example, the communications unit 506 can include a network interface card or a wireless transceiver facilitating communications over a wired or wireless network or connection. The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display or other suitable output device. Note, however, that the I/O unit 508 may be omitted if the control system 500 does not require local I/O, such as when the control system 500 can be accessed remotely.

In some embodiments, the instructions executed by the processing device 502 can include instructions that implement functionality related to the use of a deformable mirror. For example, the instructions executed by the processing device 502 can cause the processing device 502 to control the actuators 304, 408, which can occur in order to control the deformation of a reflective surface 302, 404 of a deformable mirror. As a particular example, the processing device 502 may interact with an external device or system that analyzes images captured by one or cameras (such as the high-speed tracking sensor 118) in order to determine how to adjust a deformable mirror, and commands for adjusting the deformable mirror can be provided to the processing device 502 for use in controlling the actuators 304, 408. Alternatively, the processing device 502 itself may analyze images captured by the one or cameras, such as by identifying the strengths of edges in the captured images, in order to determine how to adjust the deformable mirror. The processing device 502 can then generate and output control signals to the actuators 304, 408 in order to actually cause the deformation of the reflective surface 302, 404 of the deformable mirror.

Although FIG. 5 illustrates one example of a control system 500 for use in a catoptric focus mechanism, various changes may be made to FIG. 5. For example, computing devices/systems can come in a wide variety of configurations, and FIG. 5 does not limit this disclosure to any particular computing device or system.

Figure 6:
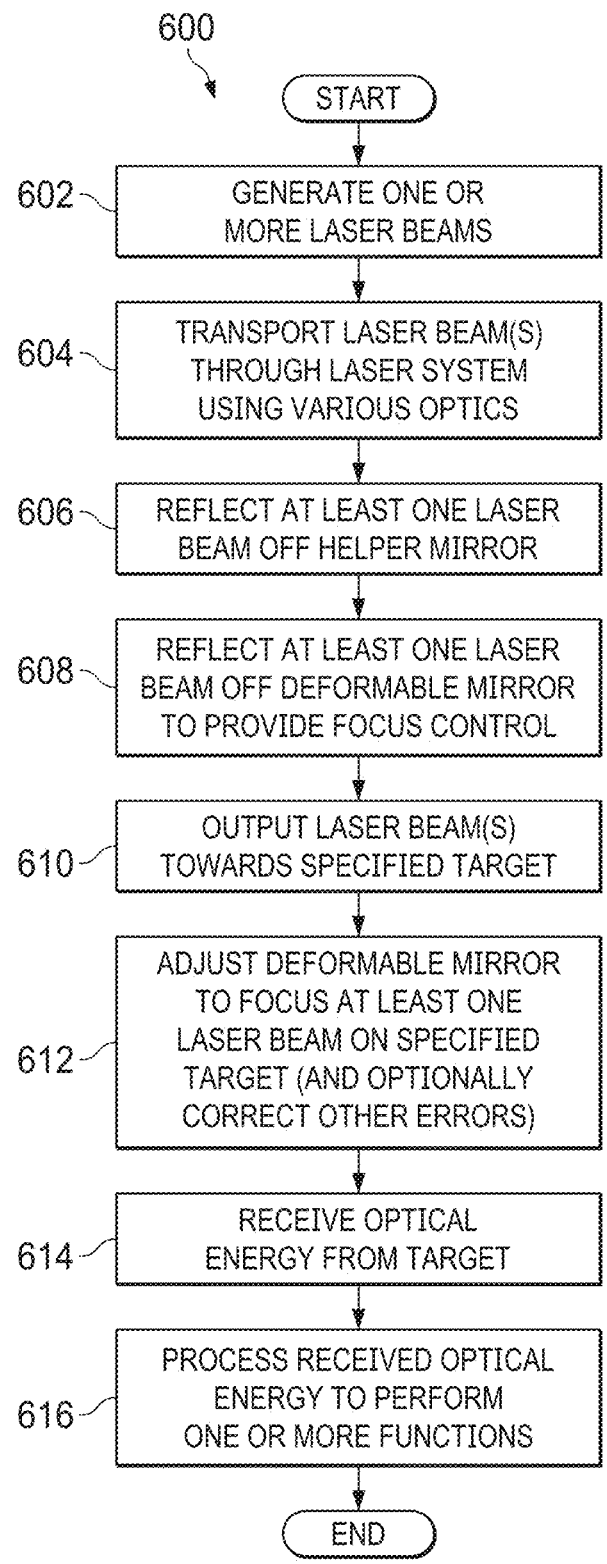
FIG. 6 illustrates an example method for using a catoptric focus mechanism in a laser system in accordance with this disclosure.

FIG. 6 illustrates an example method 600 for using a catoptric focus mechanism in a laser system in accordance with this disclosure. For ease of explanation, the method 600 may be described as involving the use of the catoptric focus mechanism 132 of FIG. 2 with a deformable mirror 206, 300, 400 in the system 100 of FIG. 1. However, the method 600 may involve the use of any suitable catoptric focus mechanism with any suitable deformable mirror in any suitable system.

As shown in FIG. 6, one or more laser beams are generated at step 602 and transported through a laser system using various optical devices at step 604. This may include, for example, the light source(s) 110 generating an HEL beam 102, an auto-alignment beam 104, and a target or boresight illuminator beam 106. This may also include the beams 102, 104, 106 being redirected, separated, or otherwise processed using various mirrors or other optical devices.

At least one laser beam may optionally be reflected off one or more helper mirrors at step 606. This may include, for example, reflecting the HEL beam 102 and the auto-alignment beam 104 off at least one helper mirror 210. The helper mirror 210 can be used to partially focus the HEL beam 102. At least one laser beam is reflected off a deformable mirror to provide focus control at step 608. This may include, for example, reflecting the HEL beam 102 and the auto-alignment beam 104 off the deformable mirror 206, 300, 400. One or more laser beams are output towards a specified target at step 610. This may include, for example, routing the focused HEL beam 102 to a telescope or other device for transmission towards a target. During this process, the deformable mirror is adjusted in order to focus at least one laser beam on the specified target at step 612. This may include, for example, causing one or more actuators 304, 408 to push and/or pull on a deformable reflective surface 302, 404 in order to adjust the focus of the HEL beam 102 on the specified target. This may also optionally include causing one or more actuators 304, 408 to push and/or pull on a deformable reflective surface 302, 404 in order to at least partially provide afocal and heating corrections, such as corrections for astigmatism and coma.

Optical energy, which may include laser or other optical energy reflected from the target, is received at step 614. This may include, for example, receiving the incoming optical energy 108, which can include infrared or other radiation associated with the target or a scene including the target. The received optical energy is processed to perform one or more functions at step 616. This may include, for example, capturing images of the target or the scene using the high-speed tracking sensor 118, performing range-finding to the target, or performing other operations related to the target or the scene.

Although FIG. 6 illustrates one example of a method 600 for using a catoptric focus mechanism in a laser system, various changes may be made to FIG. 6. For example, while shown as a series of steps, various steps in FIG. 6 can overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
 a deformable mirror comprising:
  a single reflective surface having a very high reflectivity and configured to reflect a high-energy laser (HEL) beam and to focus the HEL beam on a target; and
  multiple actuators arranged in multiple rings or in a hexagonal pattern and configured to adjust a shape of the reflective surface in order to maintain focus of the HEL beam on the target over a specified range of distances between the deformable mirror and the target;
 wherein at least one portion of the reflective surface is configured to be adjusted by the actuators and obtain convex, flat, and concave shapes.

2. The apparatus of claim 1, further comprising:
 at least one additional mirror configured to provide a nominal focus for the HEL beam.

3. The apparatus of claim 2, wherein the at least one additional mirror is configured to provide the nominal focus for the HEL beam prior to the HEL beam reaching the deformable mirror.

4. The apparatus of claim 1, wherein the actuators are further configured to adjust the shape of the reflective surface in order to provide at least one of: afocal corrections and heating corrections.

5. The apparatus of claim 1, wherein the actuators are further configured to adjust the shape of the reflective surface in order to provide at least one of: stigmatism corrections and coma corrections.

6. The apparatus of claim 1, further comprising:
 a controller configured to control operation of the actuators.

7. A system comprising:
 at least one light source configured to generate at least a high-energy laser (HEL) beam;
 a telescope configured to direct the HEL beam towards a target and to receive optical energy from the target;
 at least one camera configured to image the target based on the received optical energy; and
 a catoptric focus mechanism comprising a deformable mirror, wherein the deformable mirror comprises:
  a single reflective surface having a very high reflectivity and configured to reflect the HEL beam and to focus the HEL beam on the target; and
  multiple actuators arranged in multiple rings or in a hexagonal pattern and configured to adjust a shape of the reflective surface in order to maintain focus of the HEL beam on the target over a specified range of distances between the deformable mirror and the target;
 wherein at least one portion of the reflective surface is configured to be adjusted by the actuators and obtain convex, flat, and concave shapes.

8. The system of claim 7, wherein the specified range of distances is between about 300 meters to about 5,000 meters.

9. The system of claim 7, wherein the catoptric focus mechanism further comprises:
 at least one additional mirror configured to provide a nominal focus for the HEL beam.

10. The system of claim 9, wherein the at least one additional mirror is configured to provide the nominal focus for the HEL beam prior to the HEL beam reaching the deformable mirror.

11. The system of claim 7, wherein the actuators are further configured to adjust the shape of the reflective surface in order to provide at least one of: afocal corrections and heating corrections.

12. The system of claim 7, wherein the actuators are further configured to adjust the shape of the reflective surface in order to provide at least one of: stigmatism corrections and coma corrections.

13. The system of claim 7, wherein the catoptric focus mechanism further comprises:
 a controller configured to control operation of the actuators.

14. The system of claim 7, wherein:
 the at least one light source is further configured to generate an auto-alignment beam and a target or boresight illuminator beam, the optical energy from the target comprising reflected optical energy from the target or boresight illuminator beam; and
 one or more sensors configured to detect the auto-alignment beam in order to identify a position of the auto-alignment beam.

15. The system of claim 14, wherein:
 the auto-alignment beam and the target or boresight illuminator beam follow a first common portion of an optical path of the HEL beam; and
 the auto-alignment beam follows a second common portion of the optical path of the HEL beam.

16. A method comprising:
 generating a high-energy laser (HEL) beam;
 directing the HEL beam towards a target;
 receiving optical energy from the target;
 imaging the target based on the received optical energy; and
 using a catoptric focus mechanism comprising a deformable mirror, focusing the HEL beam on the target;
 wherein the deformable mirror comprises:
  a single reflective surface having a very high reflectivity and configured to reflect the HEL beam and to focus the HEL beam on the target; and
  multiple actuators arranged in multiple rings or in a hexagonal pattern and configured to adjust a shape of the reflective surface in order to maintain focus of the HEL beam on the target over a specified range of distances between the deformable mirror and the target; and
 wherein at least one portion of the reflective surface is configured to be adjusted by the actuators and obtain convex, flat, and concave shapes.

17. The method of claim 16, further comprising:
 using at least one additional mirror, providing a nominal focus for the HEL beam.

18. The method of claim 16, further comprising:
using the actuators, adjusting the shape of the reflective surface in order to provide at least one of: afocal corrections and heating corrections.

19. The apparatus of claim 1, wherein:
the multiple actuators are arranged in the multiple rings; and
the multiple rings include:
 a first ring of actuators proximate to a center of the reflective surface;
 a second ring of actuators around the first ring; and
 a third ring of actuators around the second ring.

20. The apparatus of claim 1, wherein the multiple actuators are arranged in the hexagonal pattern.

\* \* \* \* \*